July 8, 1958 R. C. LAMY 2,842,755
TERNARY MAGNETIC STORAGE DEVICE
Filed Aug. 25, 1955
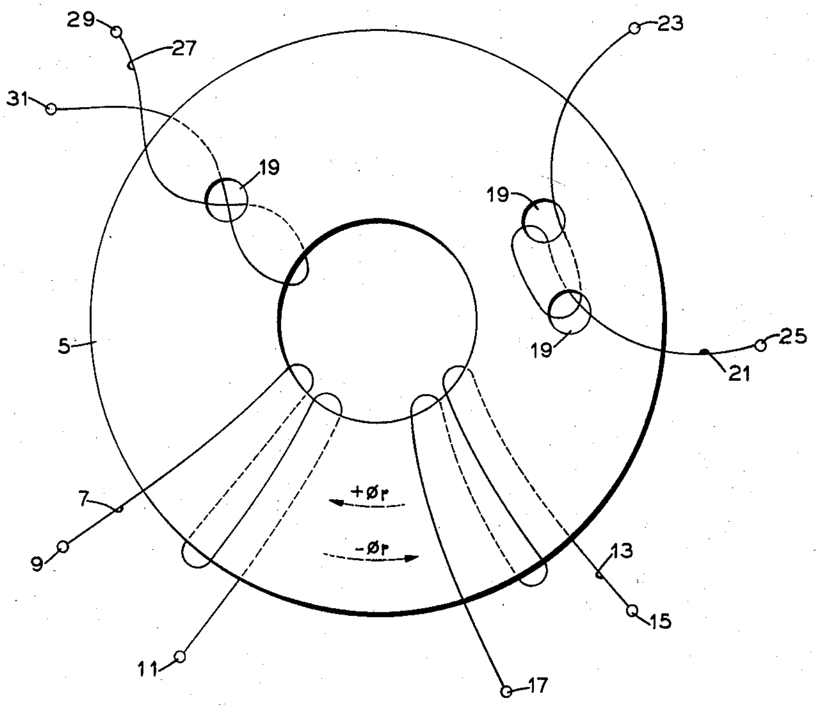
INVENTOR.
RICHARD C. LAMY
BY Paul M. Brannen
AGENT 2,842,755

TERNARY MAGNETIC STORAGE DEVICE

Richard C. Lamy, Hyde Park, N. Y., assignor to International Business Machines Corporation, New York, N. Y., a corporation of New York Application August 25, 1955, Serial No. 530,522

6 Claims. (Cl. 340—174)

This invention relates to magnetic storage devices and particularly to an improved magnetic storage device having three stable conditions or states.

It has previously been proposed to employ magnetic storage devices for storing information on a binary basis, utilizing the fact that a magnetic material has two states of stable remanent flux, so that a core of such material, provided with suitable means for placing the core in one or the other of its two remanent flux states and means for determining the sense of the remanent flux, may be considered as a binary device. It has also previously been proposed to combine two or more binary devices, including magnetic storage devices, to provide an assembly which has at least three stable states, that is, a ternary storage device. However, such devices require more than one magnetic storage device to accomplish the desired results.

Accordingly, it is an object of this invention to provide a ternary magnetic storage device employing only a single magnetic circuit provided with a novel arrangement of windings.

Another object of this invention is to provide a ternary magnetic storage device having a sampling winding which is inhibited from sampling the core as a result of energizing an inhibiting winding.

A further object of this invention is to provide an improved ternary magnetic storage device.

Yet another object of the invention is to provide an improved pulse transfer controlling device utilizing a magnetic core.

Other objects of the invention will be pointed out in the following description and claims and illustrated in the accompanying drawing, which discloses, by way of example, the principle of the invention and the best mode, which has been contemplated, of applying that principle.

The single accompanying drawing is a diagrammatic illustration of a preferred embodiment of the invention, wherein a magnetic core is provided with a novel arrangement of windings to permit the use of the arrangement as a ternary storage device.

Briefly described, the invention comprises a core of magnetic material, preferably but not necessarily toroidal in form, having a sampling and an inhibiting winding of novel form mounted thereon, in addition to conventional input and output windings. The sampling winding is of the type disclosed and claimed in a copending application for Letters Patent of the United States Serial No. 383,568 filed on October 1, 1953, for Non-Destructive Sensing of Magnetic Cores, on behalf of Edgar A. Brown, and, as disclosed in the Brown application, comprises a winding arranged to set up an auxiliary or sampling flux in the magnetic core which is at right angles, or in quadrature, to the principal or remanent flux in the core. The inhibiting winding is of the type disclosed and claimed in a copending application for Letters Patent of the United States Serial No. 530,523, filed on August 25, 1955, for Sampling Winding for Magnetic Cores, on behalf of Edgar A. Brown and Richard C. Lamy, and, as disclosed in the Brown and Lamy application, comprises a winding arranged with a first and a second portion arranged to link a first and a second subdivided portion of the core, the relationship being such that the flow of current through the first and second portions of the winding are opposite in direction relative to each other, so that the flux set up in the subdivided core portions will be oppositely directed relative to each other.

Referring now to the drawing, the reference character 5 designates a toroidal core of magnetic material. A conventional input winding 7 provided with terminals 9 and 11, and a conventional output winding 13 provided with terminals 15 and 17 are wound on the core in the usual manner, as shown.

The core is provided with three openings 19, drilled or otherwise formed in the core material. These openings may pass through the core at any angle with respect to the axis of the toroid, and are here shown as being parallel to the core axis. Moreover, although the preferable position for the openings is such that they intersect the center line of the core, their position is not limited to this particular arrangement.

A sampling winding 21 is wound through a pair of the openings 19, as shown, so that the plane of the sampling winding lies along the axis of the core itself. The winding is shown as being terminated at terminals 23 and 25. It is apparent that the flux set up in the sampling winding by suitably energizing the winding will be at right angles to the flux set up in the core by the energization of input winding 7, and the remanent flux in the core which remains after the input winding is de-energized.

An inhibiting winding 27, provided with terminals 29 and 31, is wound around the core and through one of the openings 19 in the manner of a "figure 8," as shown. More than one turn may be used as needed, and it is also to be understood that the inhibiting winding may comprise two separate windings, connected in series or parallel, instead of the single winding shown.

In operation, the core 5 may be set in one or the other of its two stable remanent flux states by supplying current of one polarity or the other to the input winding 7. It may be assumed, for example, that if the polarity of the energy supplied to the input winding 7 is such that terminal 9 is positive with respect to terminal 11, the sense of the remanent flux in the core will be in a clockwise direction which can arbitrarily be designated as the positive sense as indicated by the arrow designated as $+\phi_r$. Conversely, if input winding 7 is energized so that terminal 11 is positive with respect to terminal 9, then the sense of the remanent flux will be in a counterclockwise direction, arbitrarily designated as the negative sense, and indicated by the arrow designated as $-\phi_r$.

With the core 5 set in one of its two remanent flux states, energization of the sampling winding 21 by energy of either polarity supplied to terminals 23 and 25 of this winding will induce an output voltage in the output winding 13, the polarity of the voltage at terminals 15 and 17 of winding 13 being dependent only upon the sense of the remanent flux in core 5, and being independent of the polarity of the energy supplied to sampling winding 21.

If the inhibiting winding 27 is now energized with a current pulse of either polarity, a subsequent energization of the sampling winding 21 will produce only a very small or inhibited output pulse at terminals 15 and 17 of output winding 13, for example, of the order of one tenth the peak voltage obtained during the first, or uninhibited sampling operation.

Following the inhibition of sampling winding 21, output pulses may be obtained at terminals 15 and 17 of winding 13 by pulsing the inhibiting winding 27 by current of either polarity, the polarity of the output pulses again depending only upon the sense of the remanent flux in the core 5. Although the magnitude of the output pulse obtained on such a subsequent sampling of the core is reduced, the output thus obtained is still indicative of the senses of the remanent flux in the core.

It can be seen from the foregoing that a magnetic core device constructed in accordance with this invention is capable of being set to at least three separate and stable states, namely, a positive or negative uninhibited state or an inhibited state. Moreover, even in the inhibited state, the sense of the flux in the core may still be determined, as explained previously, by employing the inhibiting winding as a sampling winding.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic storage device comprising a closed core of magnetic material capable of assuming a first or a second remanent flux state, input means for establishing a remanent magnetic flux in said core, sampling means for at times establishing a sampling flux in said core having at least a portion of said sampling flux in a path at right angles to said remanent flux, output means responsive to changes in the net flux in said core, and inhibiting means for inhibiting said sampling means comprising means for establishing auxiliary fluxes in adjacent subdivided portions of said core, the sense of said auxiliary flux being oppositely directed in each of said subdivided portions from the sense of the auxiliary flux in the adjacent subdivided portion of said core.

2. A magnetic storage device comprising a closed core of magnetic material capable of assuming a first or a second remanent flux state and having a portion thereof divided into a plurality of adjacent and parallel flux paths, input means for establishing a remanent magnetic flux in said core, output means responsive to changes in the net flux in said core, sampling means effective at times to establish a sampling flux in said core, at least a portion of said sampling flux being at right angles to the remanent flux in said core, and means for inhibiting the action of said sampling means, comprising means for creating auxiliary flux in said adjacent flux paths, the sense of the auxiliary flux in each of said adjacent flux paths being oppositely directed from the sense of the auxiliary flux in the adjacent auxiliary flux path.

3. A magnetic storage device comprising a closed core of magnetic material capable of assuming a first or a second remanent flux state and having a portion thereof divided into a first and a second parallel and adjacent portion, input means effective to establish a remanent flux in said core, output means responsive to changes in the net flux in said core, a sampling winding for said core effective when energized to establish a sampling flux in said core, at least a portion of said sampling flux being at right angles to said remanent flux, and means for inhibiting the action of said sampling winding comprising an inhibiting winding having first and second portions linking said first and second parallel and adjacent portions of said core respectively and effective when said inhibiting winding is energized for creating auxiliary flux in said parallel and adjacent core portions, the sense of the auxiliary flux in the first of said parallel and adjacent portions being oppositely directed from the sense of the auxiliary flux in the second of said parallel and adjacent portions.

4. A magnetic storage device comprising a closed magnetic circuit capable of assuming a first or a second remanent flux state, an input winding linking said said magnetic circuit, an output winding linking said magnetic circuit, a pair of spaced openings positioned in said magnetic circuit, a sampling winding wound through said pair of spaced openings, a single opening positioned in said magnetic circuit, and an inhibiting winding wound through said single opening and about said circuit in a figure 8 configuration.

5. An information storage device comprising a closed magnetic circuit capable of assuming a first and a second state of remanent flux, an input winding positioned about said circuit and effective when energized to selectively condition said magnetic circuit to said first or said second state of remanent flux, an output winding positioned about said circuit in which voltages are induced by changes in the net flux in said magnetic circuit, a pair of spaced openings positioned in said magnetic circuit, a sampling winding wound through said openings and effective when energized to create a sampling flux in said magnetic circuit, said sampling flux inducing a voltage in said output winding indicative of the sense of the remanent flux in said core, a single opening positioned in said magnetic circuit, and an inhibiting winding wound through said single opening and about said magnetic circuit in a figure 8 configuration, said inhibiting winding being effective when energized to inhibit said sampling winding from producing an output voltage of relatively large magnitude in said output winding.

6. A pulse transfer controlling device comprising in combination, a core of magnetic material capable of assuming a first or a second state of remanent magnetic flux, winding means associated with said core, said winding means including a first electrical circuit for establishing a magnetic flux in said core substantially transverse to said remanent magnetic flux and a second electrical circuit for establishing oppositely directed magnetic fluxes in adjacent portions of said core in a direction transverse to the flux established by said first electrical circuit, said winding means further including input and output windings.

References Cited in the file of this patent

UNITED STATES PATENTS

| | | |
|---|---|---|
| 2,700,703 | Nordyke | Jan. 25, 1955 |
| 2,733,424 | Chen | Jan. 31, 1956 |
| 2,741,757 | Devol et al. | Apr. 10, 1956 |

OTHER REFERENCES

1955 Joint Western Computer Conference, pp. 111 to 116, March 1955, "A New Non-Destructive Read for Magnetic Cores," Thorensen and Arsenault.

Communications and Electronics, pp. 822 to 830, January 1954, "Nondestructive Sensing of Magnetic Cores," Dudley, Buck and Werner Frank.